June 6, 1933. H. A. W. WOOD 1,912,506
WEB CHANGE DEVICE
Original Filed July 29, 1930 11 Sheets-Sheet 1
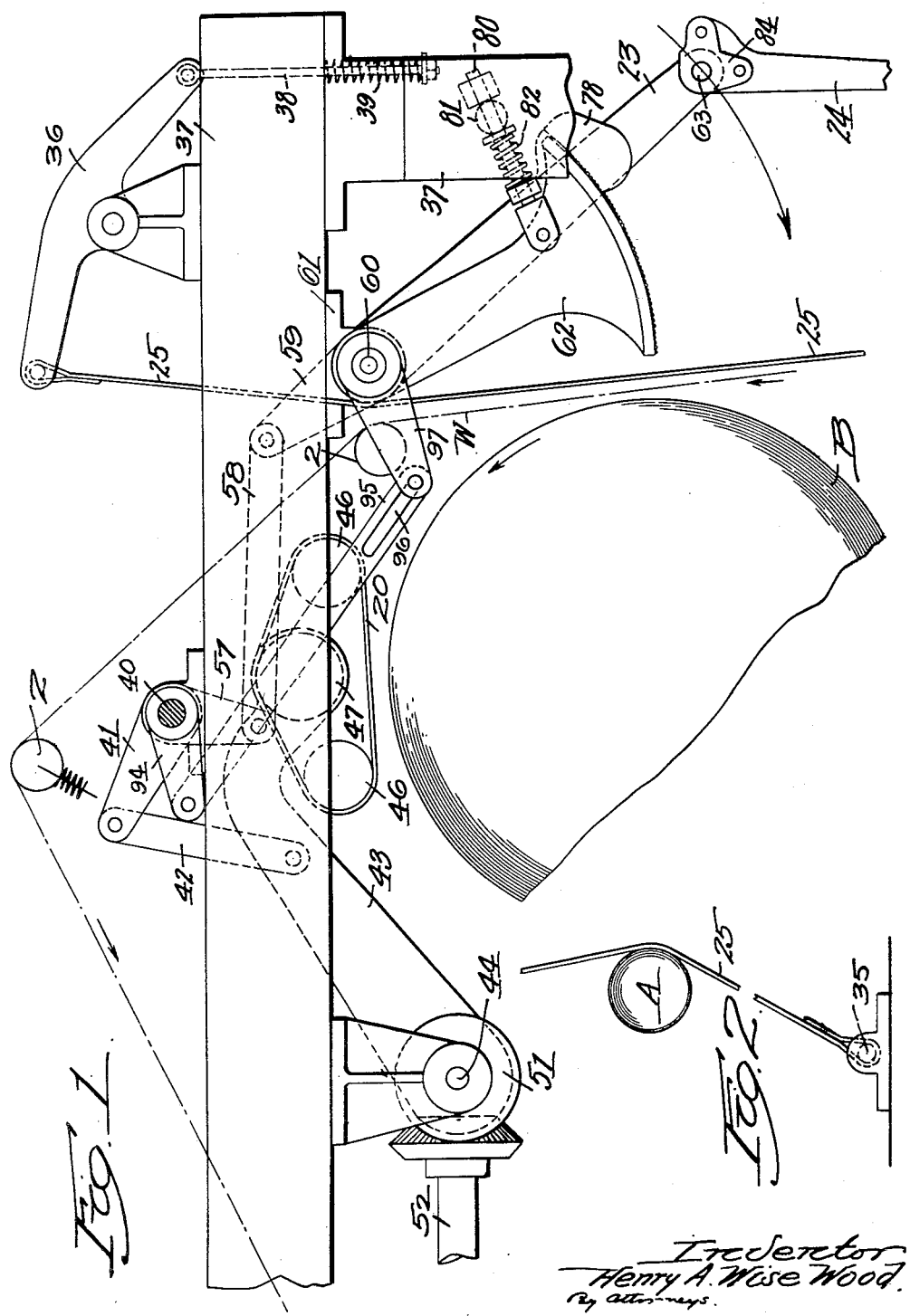

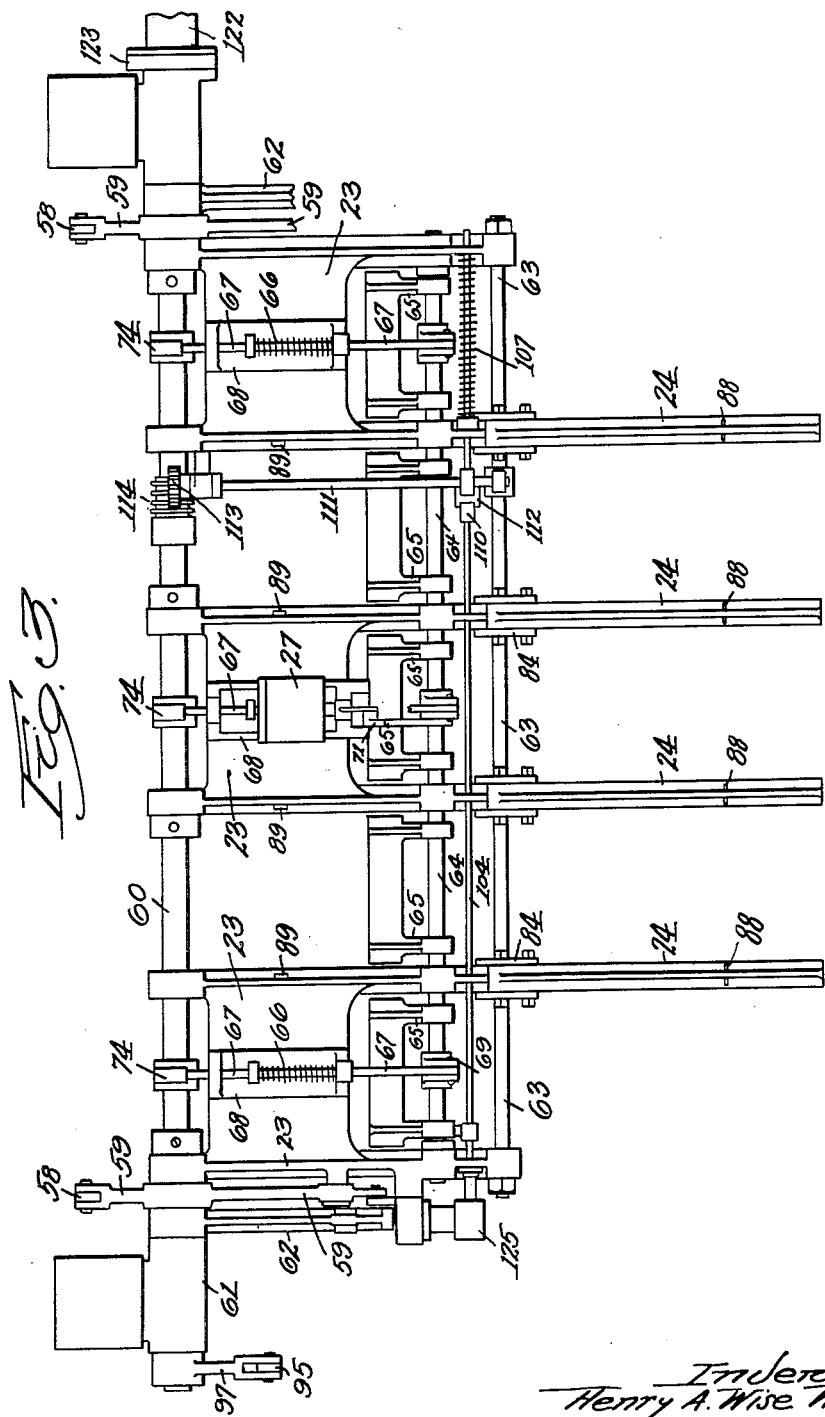

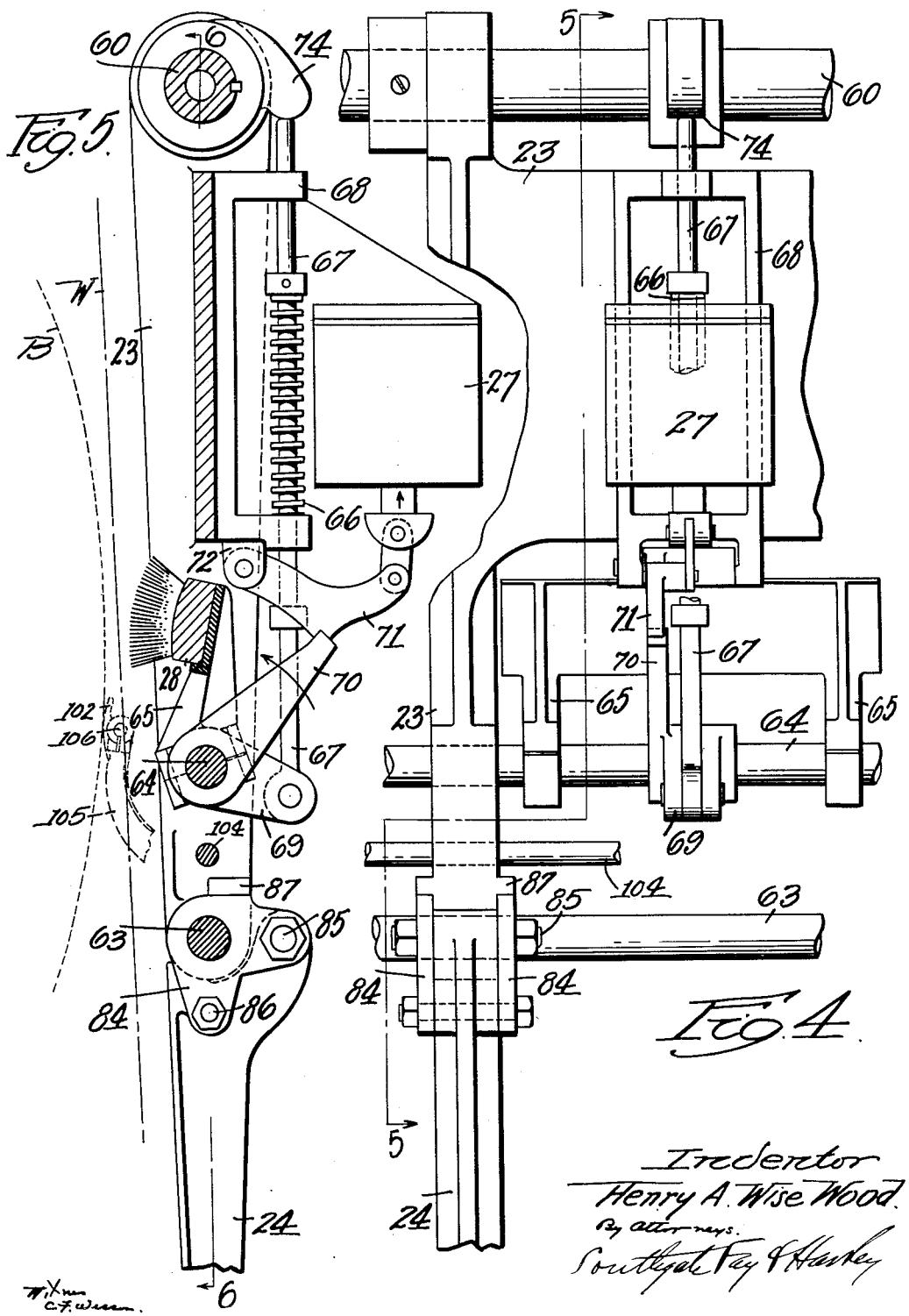

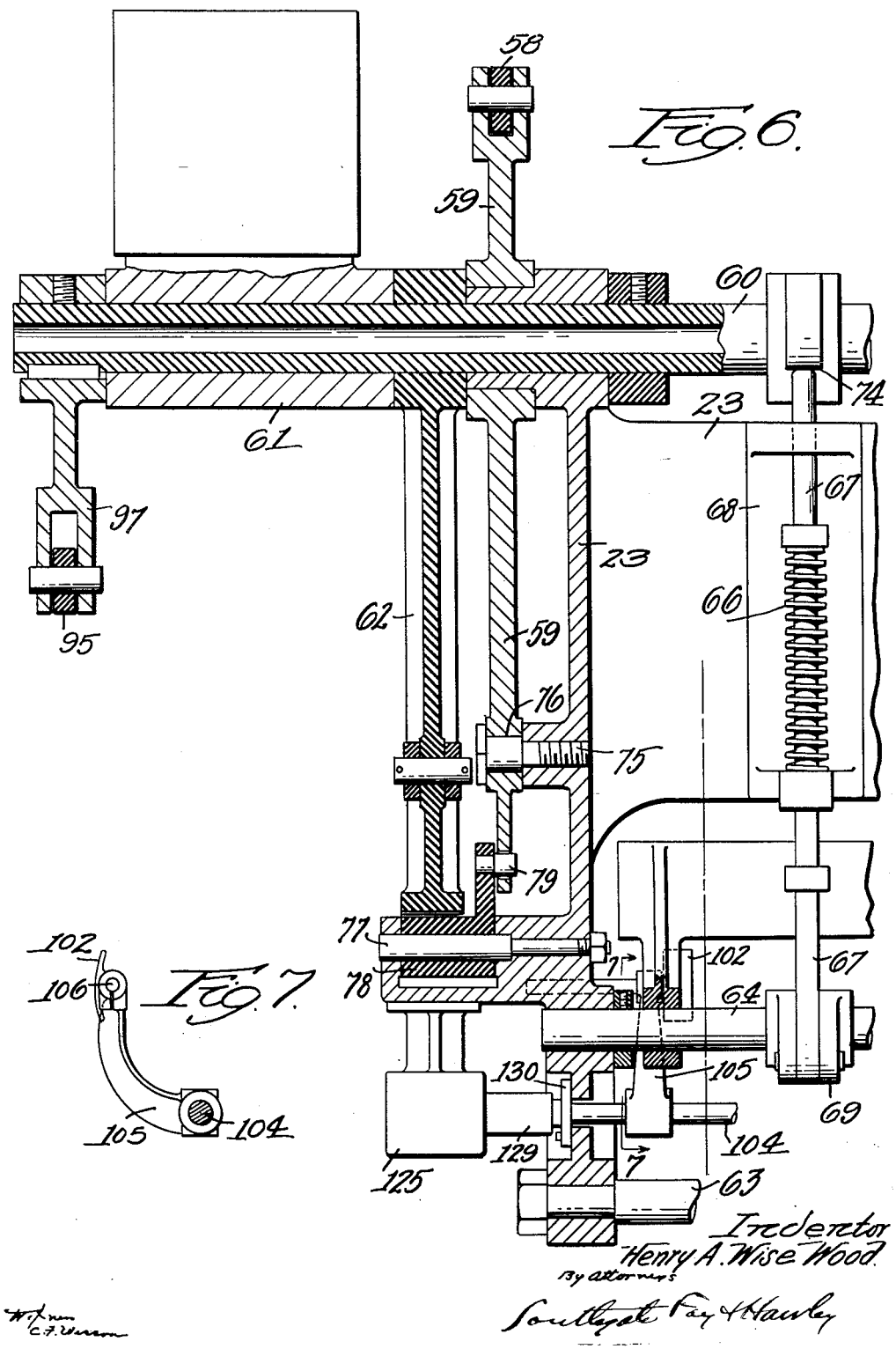

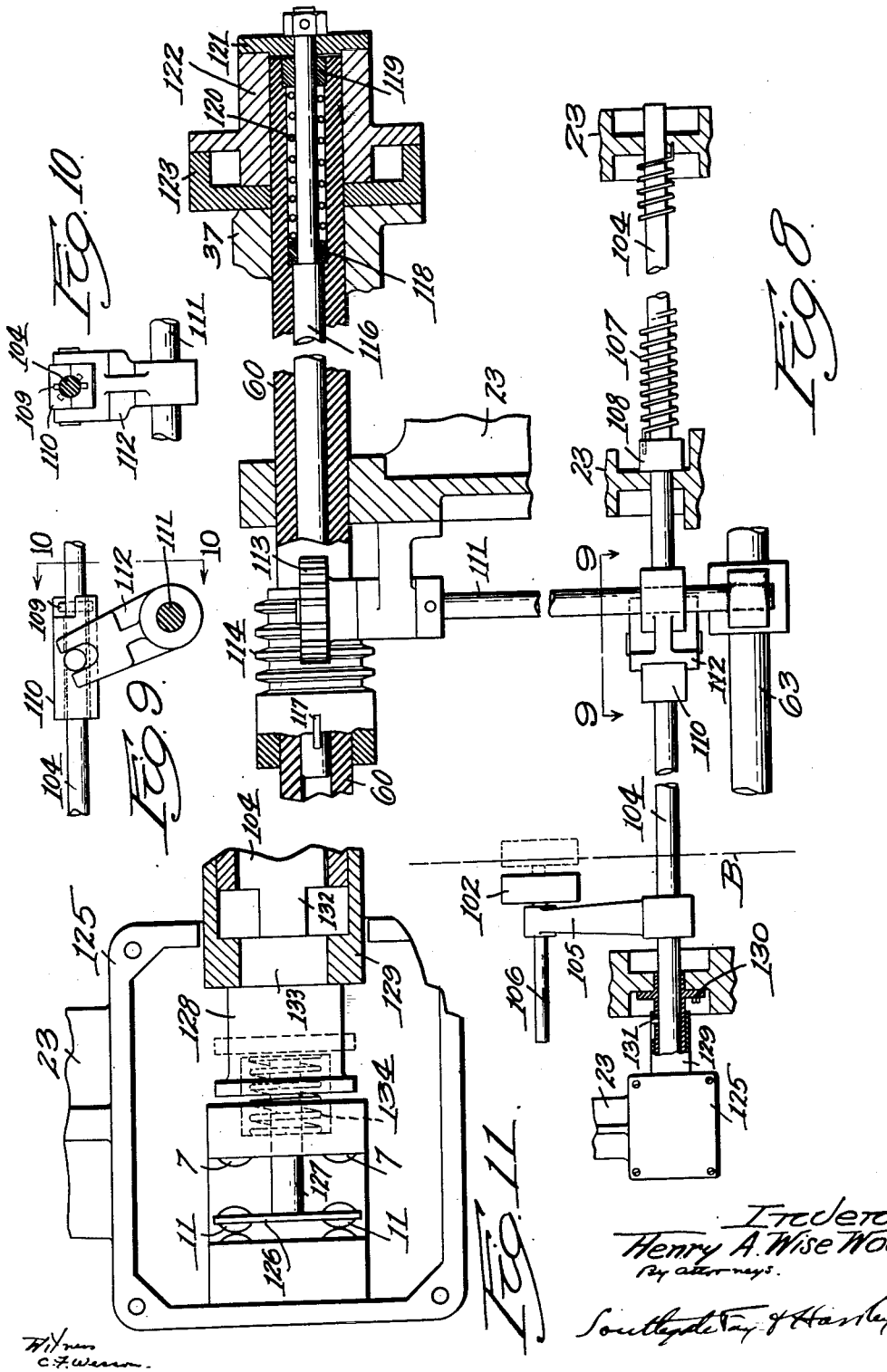

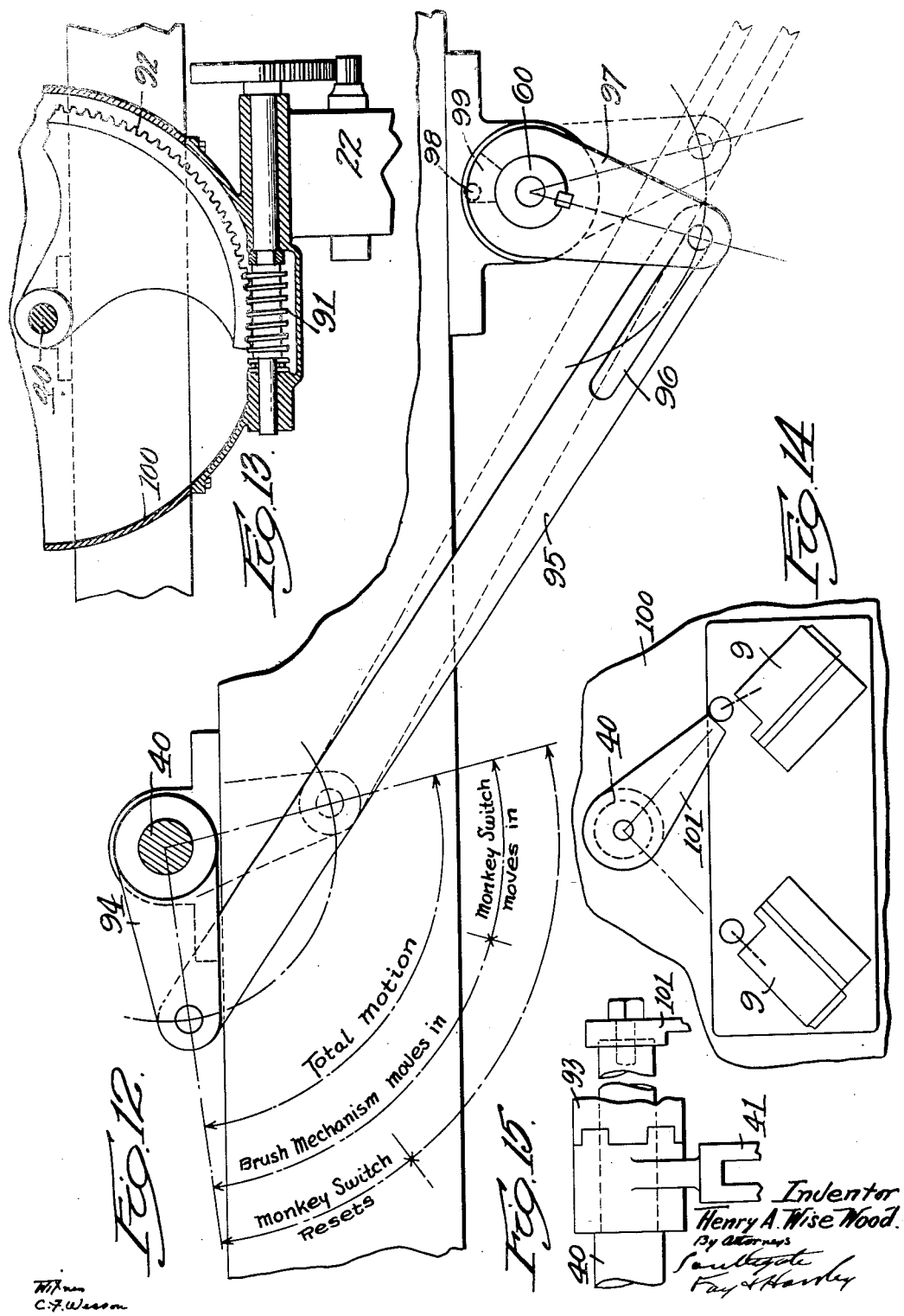

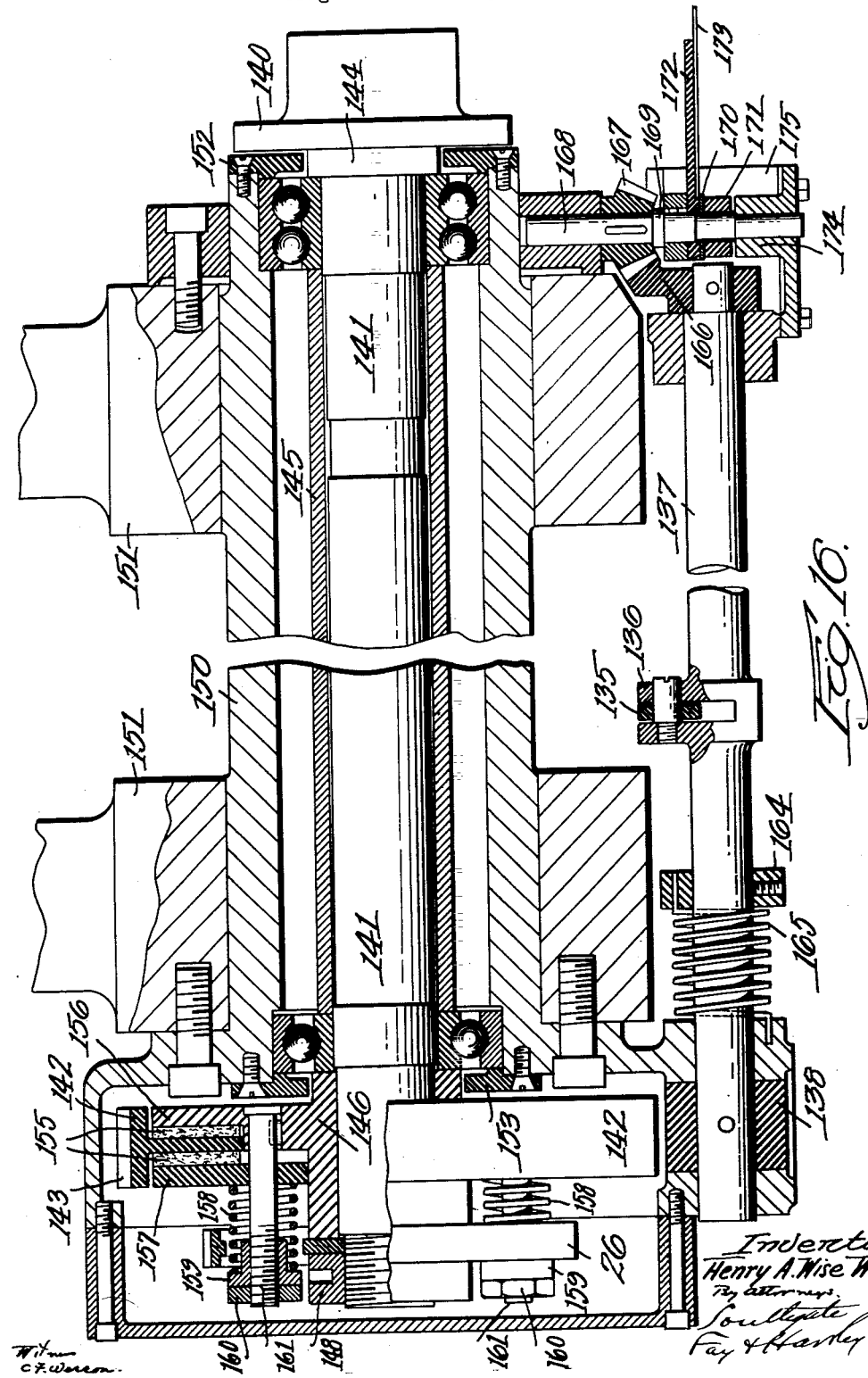

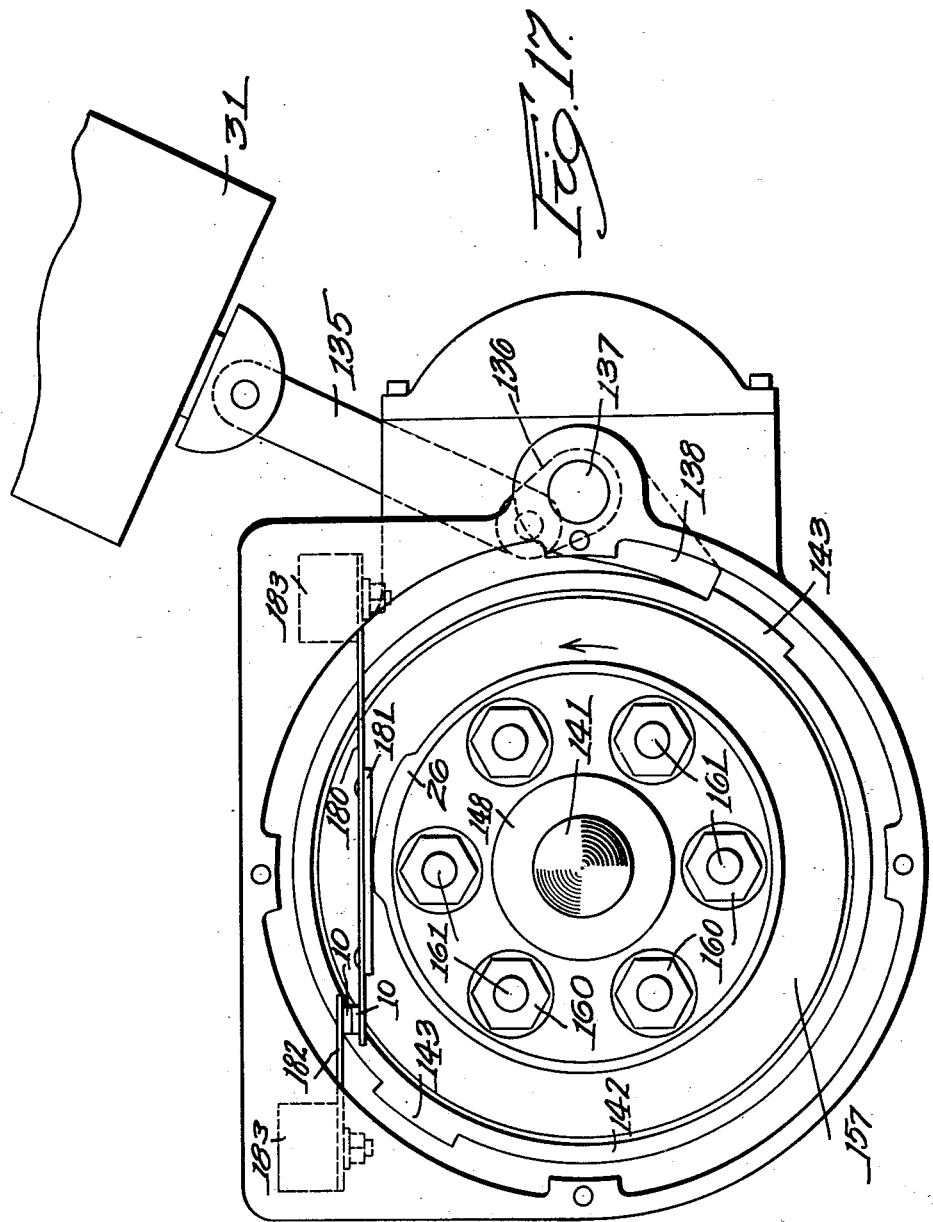

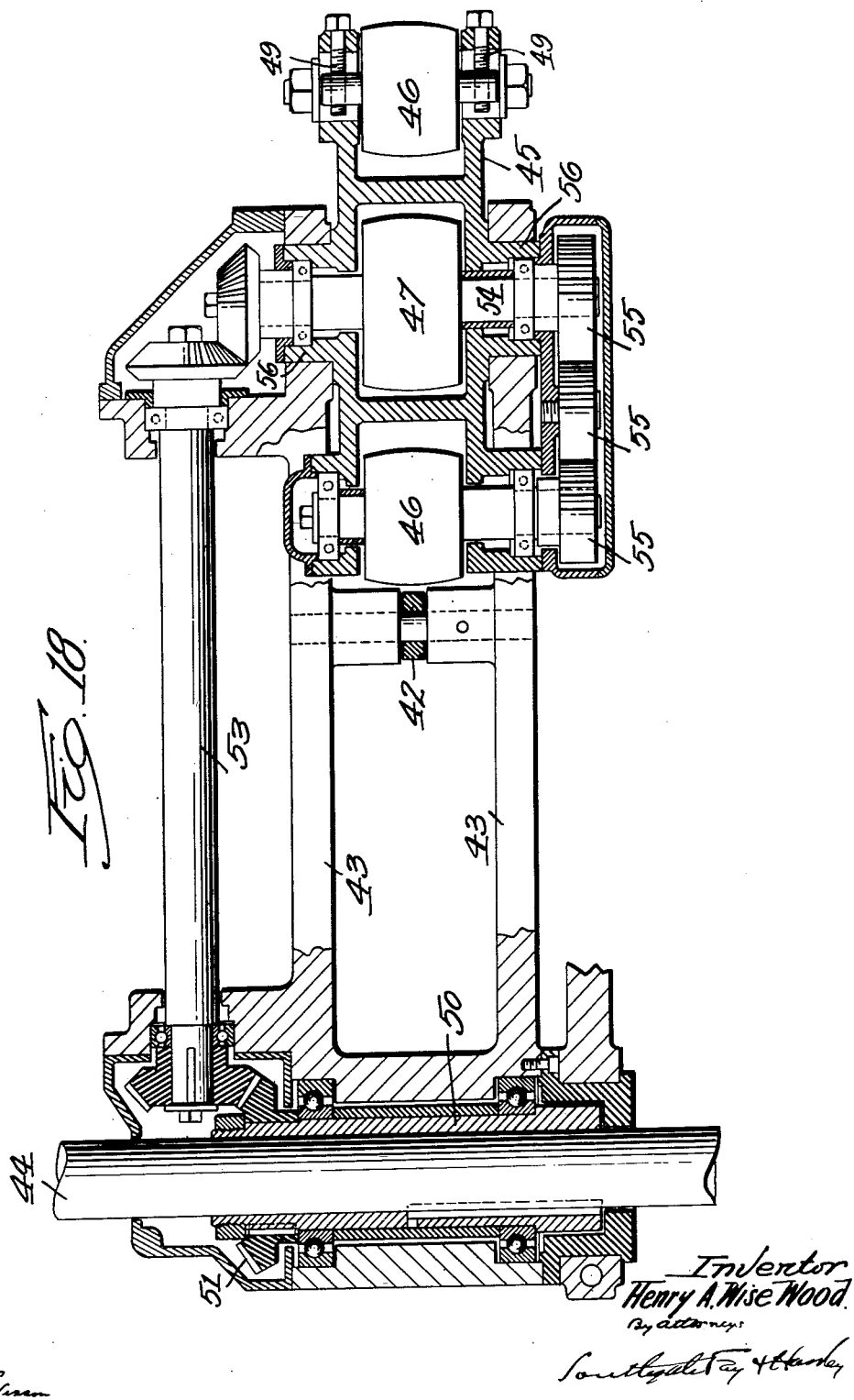

June 6, 1933.  H. A. W. WOOD  1,912,506
WEB CHANGE DEVICE
Original Filed July 29, 1930   11 Sheets-Sheet 10

Inventor
Henry A. Wise Wood
By Attorneys
Southgate Fay & Hanley

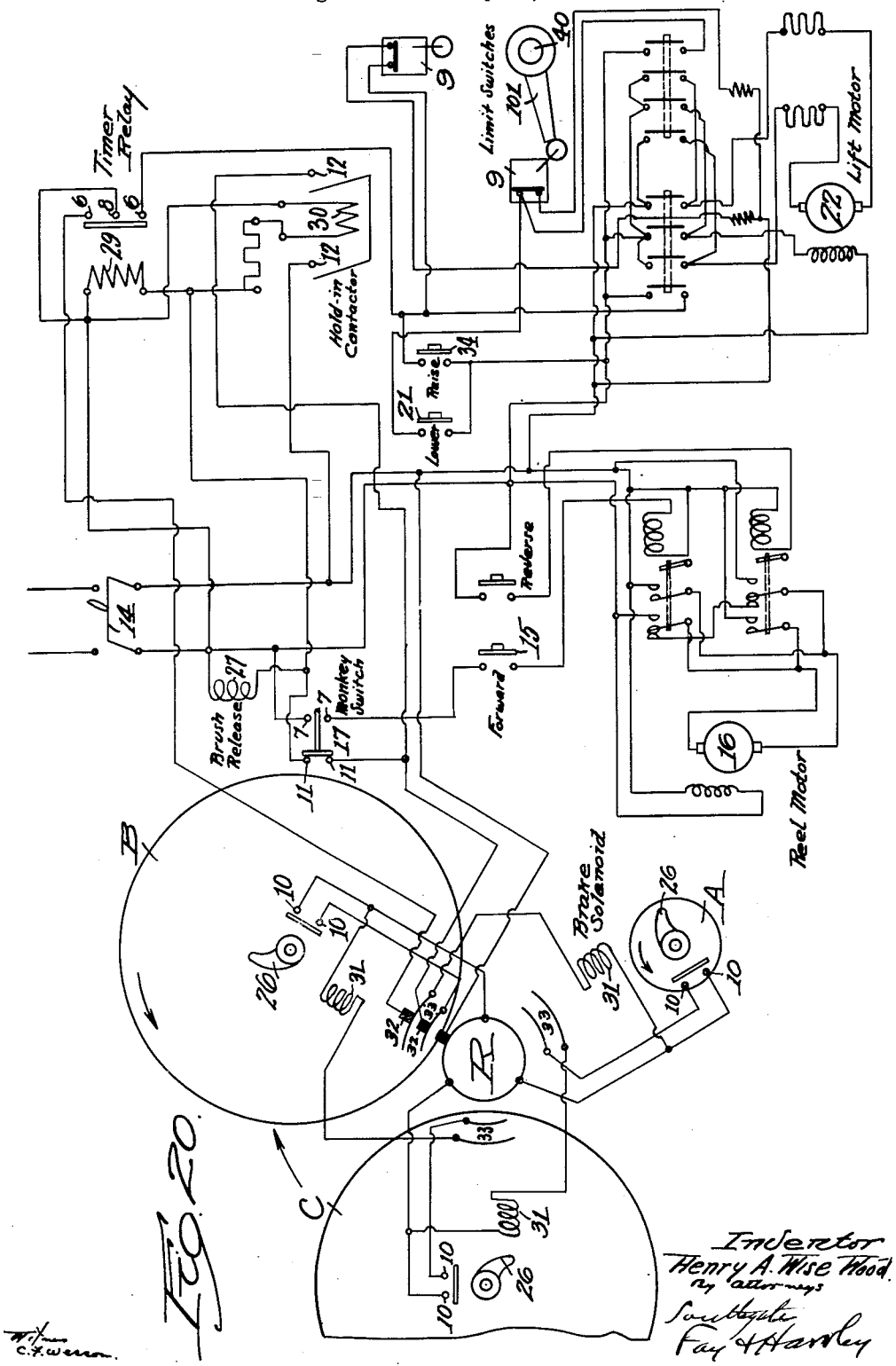

Patented June 6, 1933

1,912,506

UNITED STATES PATENT OFFICE

HENRY A. WISE WOOD, OF NEW YORK, N. Y., ASSIGNOR TO WOOD NEWSPAPER MACHINERY CORPORATION, OF NEW YORK, N. Y., A CORPORATION OF VIRGINIA

WEB CHANGE DEVICE

Application filed July 29, 1930, Serial No. 471,461. Renewed March 17, 1932.

This invention relates to that part of a machine, such as a printing machine, employed for replenishing the web rolls while the machine is running at full speed.

The principal objects of the invention are to provide mechanical and automatic means for lowering a propelling device into contact with the new web roll to bring it up to web speed before the pasting operation; to provide means which will automatically raise the propelling device at the proper time; to provide means for mechanically lowering a frame work carrying means for pressing the web against the incoming roll at the proper time and then raising it again or draw it back from the path of the web roll as it moves from pasting to running position; to provide means for operating a limit switch to stop the reel carrying the roll of paper at a predetermined distance from the web pressing means; to provide improved means for releasing the web pressing means at the proper instant and in correct relation with the position of the paste on the incoming roll; to provide improved means to apply a yielding pressure against the web to press it against the incoming roll; to provide tension straps for the web and means whereby the pressure applied will operate through the tension straps so that no lifting of the tension straps will be necessary; to provide a simple construction for maintaining a proper tension on the web coming from the roll; to provide novel means for severing the web and applying a brake to stop the exhausted end; to provide the last named means to operate so that a measured length of paper will be paid off subsequent to splicing; to provide improvements in the means for bringing the new roll up to web speed over the United States Patent to Tornberg No. 1,738,083; to provide improvements in the quick change web splicing device invented by myself which is now pending in an application, Serial No. 443,083, filed April 10, 1930 and in general to provide a complete device for performing these several operations automatically in their proper order without reducing the speed of the printing press.

Other objects and advantages of the invention will appear hereinafter.

Reference is to be had to the accompanying drawings, in which

Fig. 1 is a side view of a part of a printing press showing the fresh web roll in position and the propelling means and a part of the means for pressing the web against the new roll, in the position these parts occupy while the running web is being fed to the press in the usual manner.

Fig. 2 is a fragmentary side view taken below the level of Fig. 1 showing the bottom of the tension device;

Fig. 3 is an end elevation of the frame and associated parts for pressing the web against the fresh web roll;

Fig. 4 is an enlarged view like a part of Fig. 3 showing one of the elements of this frame;

Fig. 5 is a sectional view on the line 5—5 of Fig. 4 showing the parts in their inactive position;

Fig. 6 is a front view of a part of the frame similar to Fig. 3 but showing most of it in section on the line 6—6 of Fig. 5;

Fig. 7 is a view of an operating element adapted to be located in the path of the moving fresh roll for setting certain parts into operation;

Fig. 8 is a view of parts taken from Fig. 3 showing the operation of the so-called monkey switch;

Fig. 9 is a sectional view on the line 9—9 of Fig. 8;

Fig. 10 is a sectional view on the line 10—10 of Fig. 9;

Fig. 11 is a view of the inside of the switch box constituting the monkey switch;

Fig. 12 is an end view indicating the operation of the lifting mechanism;

Fig. 13 is a sectional view showing the connection of the lift motor with the adjacent parts which operate as far as the shaft which operates to swing the frame;

Fig. 14 is a view indicating the relationship of the limit switches with the parts which operate them;

Fig. 15 is a view of the clutch on the shaft shown in Fig. 12;

Fig. 16 is a diametrical sectional view of the brake and knife mechanism;

Fig. 17 is an end view thereof;

Fig. 18 is a central sectional view of the caterpillar web roll propelling mechanism;

Fig. 20 is a wiring diagram showing the various electrical connections and apparatus involved in this machine.

Figure 19:
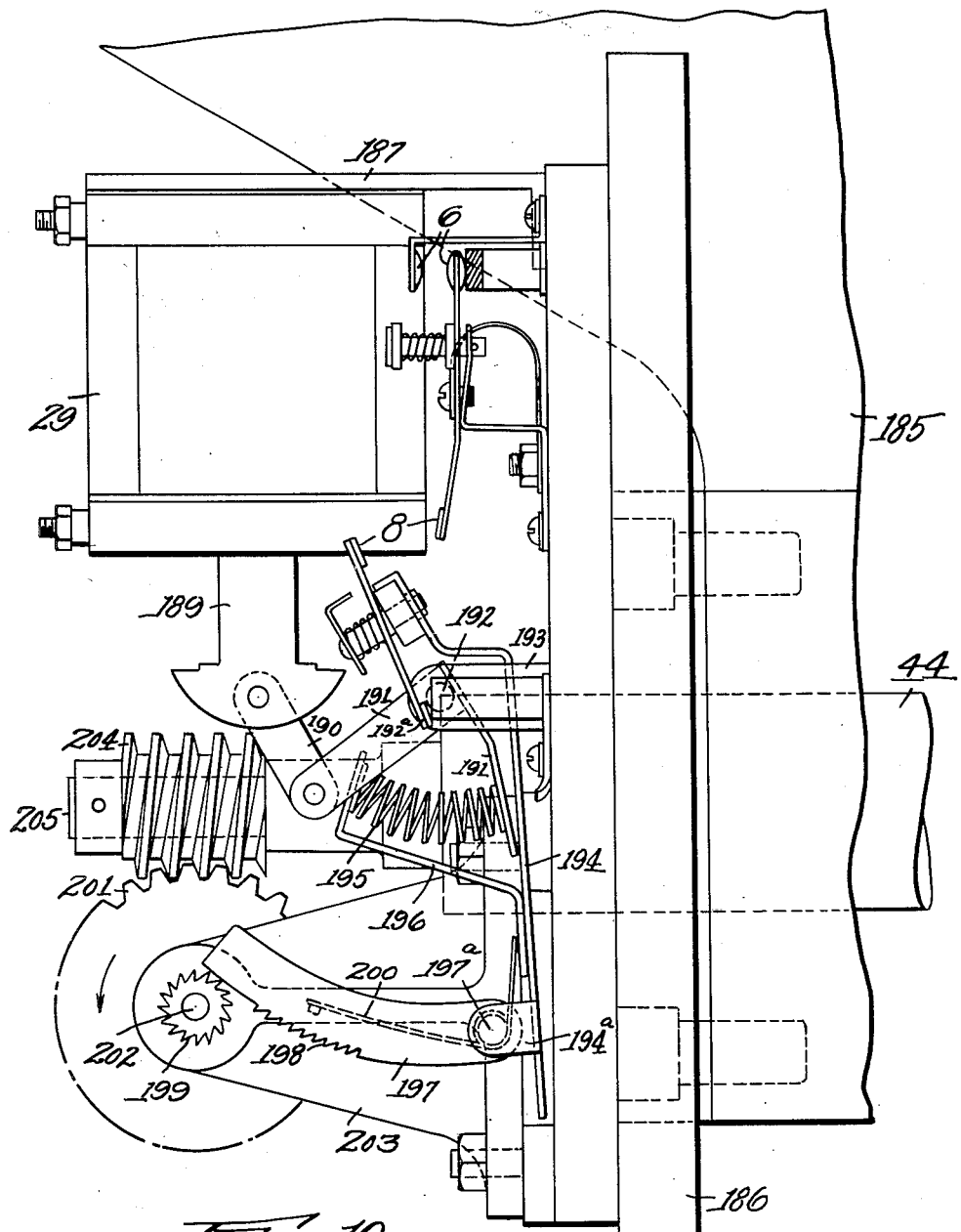
Fig. 19 is an edge view of the means for controlling the application of the brake and the severing knife after a measured length of paper has been fed from the stub.

In a preferred form of the invention, the mechanism, in brief, comprises a movable brush, or other soft web engaging device, carried on swinging arms which are lowered into operative position by the action of a motor which at the same time lowers a caterpillar drive for the new roll. When the new roll is up to speed, the reel is run forward until the new roll touches an arm and operates a monkey switch, at which time the reel is stopped and the pasting mechanism set in action. After the splice has been made and a certain length of paper run a brake automatically operates and the brush arms and caterpillar are automatically lifted.

A general idea of the nature of the invention will be obtained by reference to Figs. 1 and 20, particularly the latter. The web W runs from the roll A into the press over guide rolls 2. The device is designed to operate in connection with a well-known type of reel R which has chucks 140 for rotatably supporting three web rolls at the same time. In the present instance, the roll that is being used and is nearly exhausted is designated A and is shown in Fig. 2 as located in its running position and in its final position in Fig. 20. The roll B is a fresh web roll which is to be moved by the rotation of the reel up into position for its end to be spliced to the running web W. It will be understood that, as is usual in this kind of pasters, this roll B is also to be rotated on its own axis by means indicated in Fig. 1. The roll C is indicated also in Fig. 20 as having been loaded on the reel so as to be ready, after the roll B has rotated to the position A, to come into position B.

It will be understood that the forward end of the incoming end of the web on the roll B is previously prepared for splicing with particular reference to some distinguishing mark on the chuck supporting it, so that the pasted leading edge of the web on the roll B will come into contact with the running web W at a definite point in the rotation of the roll B on its own axis.

When the butt A is getting quite small, the "lower" button 21 is pressed. This, as will be seen from the diagram, connects up the lift motor 22 with the line through the switch 14 to start the lift motor in the direction which is necessary to lower the caterpillar 20 and the frame arms 23. The way in which these motions are accomplished will be described later.

The caterpillar is let down until it contacts with, and starts revolving, the incoming roll B. The arms 23 are let down until their arm extensions 24 rest against the tension straps 25, which pass over the butt A, and press the web against the butt. Four arms 24 and four straps 25 are shown.

When the operator decides that the butt is sufficiently exhausted, he presses and holds down the "forward" button 15. By the closing of the line switch 14 and pressing of the "forward" button 15, the current is established in the circuit to the reel motor 16. This cannot be accomplished in the position shown in Fig. 20 but can be in that shown in Fig. 1. In the latter position the pair of contacts 11 of the "monkey" switch 17 are not closed as shown in Fig. 20 but the contacts 7 are, the roll B not having moved up into a position to operate the arm 102. The reel as a whole continues to rotate into a position where the lowering of the caterpillar 20 will cause it to contact with the upper surface of the new roll B. Just prior to splicing, the roll is in the position shown in Fig. 1 and the rotation of the reel by the energizing of the motor 16 swings it over to the position shown in Fig. 20.

Thus the reel is revolved then by the motor 16 in the forward direction with the incoming roll B being rotated on its own axis at web speed. Near the end of the rotation of the motor 22 in the lowering direction the monkey switch arm 102, which is in the path of the oncoming roll B, is engaged by that roll and turned. The arm of this switch is in the path of the incoming roll between it and the web W. This part of the operation of course is automatic. This opens the contacts 7 as shown in Fig. 20 and stops rotation of the reel. It also closes the contacts 11.

During a complete rotation of the roll B on its own axis the cam 26 on the chuck of the fresh roll B engages the roll switch and completes the circuit through the pair of contacts 10. This completes a circuit through the contacts 11 and 10 to energize a brush release solenoid 27. In a manner to be described, this trips a brush 28 to come into position to press the web against the incoming roll B for making the splice. This brush is mounted on the frame arms 23 as will appear.

Another effect of the closing of the contacts 10 while the contacts 11 are closed, is to energize the coil 29 of the timer relay. This controls the measuring off of a certain length of paper before the brake is applied, as will appear. Another effect of this closing of the contacts 11 and 10 is to energize the coil 30 of the hold-in contactors to close the two contacts 12. In this way it will be seen that the contacts 10 need only make and not break a circuit because it will be held in circuit by this contactor after the circuit is once established through the contacts 10. When the timer relay has controlled the measuring off of the proper length of paper, contacts 6, 8 and 6 are closed automatically as will appear to apply the severing knife and the brake for severing the old web and also to start the lift motor 22 in a direction to lift the frame arms 23 and the caterpillar 20.

Near the end of the rotation of the lift motor in this direction, which is stopped by the opening of contacts in the limit switch 9, the monkey switch 17 is re-set so that the contacts 11 are open and the contacts 7 are closed. The opening of the contacts 11 deenergizes the coil 23 of the brush release, the coil 29 of the timer relay, the coil 30 of the hold-in contactor and also the brake solenoid 31 that is in circuit at this time in connection with the stub A.

It will be understood that one brake solenoid 31 has been brought into the circuit by the rotation of the reel and the contact of contacts 32 carried by the reel with flexible spring contacts 33 located in stationary position. There are three sets of contacts 33. When the contacts 7 close, the pressing of the forward button 15 will rotate the reel forward and the new roll B against the tension belts 25. A "raise" button 34 is provided in case it is desired to lift the caterpillar and arms without pasting.

By referring now to Figs. 1 and 2, it is to be observed that the tension device consists of a plurality of straps 25 fixed to a pin or pins 35 fixed to the floor or some stationary part. At the top these straps are connected to a rocking beam or lever 36 pivoted on a bracket carried by the frame 37 of the printing press. At the other end, this lever is provided with a pivot rod 38 having a spring 39 for holding it down with the desired amount of tension to keep the tension straps in proper condition to cause the web W to run into the press smoothly and prevent its overfeeding at any time.

Also mounted on a bracket on the frame 37 is a shaft 40 provided with an arm 41 fixed to it which, by means of a link 42, operates an arm 43 pivoted on a shaft 44 supported by the frame. On this arm 43 is pivoted a frame 45 which supports three rolls 46, 46 and 47 over which the caterpillar web roll propelling device 20 operates. The turning of this shaft 40 results in lowering or raising the caterpillar.

The shaft 44 on which the frame 43 is pivoted is provided with a sleeve 50 running in ball bearings, the outer cages of which are mounted in suitable recesses in the frame 43. This sleeve is keyed to the shaft and carries a bevel gear 51 which receives its power from a similar gear on a shaft 52. The shaft 52 is connected positively with the press to rotate at a speed proportionate to the speed of the printing couple. The gearing about to be described is so proportioned that the caterpillar belt 20 will move along at the same surface speed as the speed of the web passing into the press. The gear 51 through a similar gear rotates a shaft 53 carried by the frame 43. The shaft 53 by another pair of bevel gears positively rotates the shaft 54 on which the pulley 47 is fixed. This pulley, through a series of gears 55, rotates one of the pulleys 46 positively while the other is an idler. The shafts of the positively driven pulley 46 and the pulley 47 are mounted in ball bearings on the frame 45. The idler pulley is made adjustable by means of screws 49. This frame is pivotally mounted on the frame 43 through journals 56. Thus this frame 45 is free to swing on the axis of the pulley 47 and the belt 20 is driven at web speed.

The shaft 40 is oscillated for the purpose of raising and lowering the belt by means of two arms 57 fixed to this shaft and links 58 which are pivotally connected with levers 59 pivoted on a hollow shaft 60. This shaft is oscillatably mounted in brackets 61 carried by the frame 37 of the printing press or other machine. The levers are directly pivoted in concentric bosses on two frame arms 23 fixed to the shaft 60. There are three frame arms 23 each connected with the shaft 60 above at two points and depending therefrom. Also depending from bearings carried by the shaft 60 are two segment arms 62 at opposite ends of the shaft. The segment arms and the frame arms are free to swing on the shaft but not to move along it.

Each of the frame arms 23 is formed of a wide central portion having reinforced vertical edges and the bearings by which the arms are supported by the shaft 60 are in vertical alignment with these edges and held against longitudinal motion by collars on the shaft. Each of these frame arms 23 is independently pivoted on the shaft but they are held tightly together to form a single rigid frame by a tie rod 63. Each of said frame arms has two bearings at the bottom of this rod and the rod has a shoulder on one end engaging against the outside bearing and a lock nut on each end for pulling up the structure solidly so as to make a rigid frame.

On the frame is mounted a brush arm shaft 64 extending the whole length of the frame. It is mounted in two bearings in each of the three frame arms in which it is free to rotate and is secured against end play by collars. A plurality of brushes 28 (five in the present instance) are mounted on pairs of brush arms 65 secured to the shaft 64. These brush arms, as shown in Fig. 5, are turned by the turning of the shaft to press the web against the new roll. The force for doing this is supplied by three springs 66 carried on vertical rods 67 slidably mounted in brackets 68 secured to the three frame arms. Three spring rod arms 69 are secured to the shaft 64 and provided with bifurcated free ends to which the lower ends of the rods are pivotally attached. Two collars are adjustably secured to each spring rod, one to limit the forward motion of the brush and the other to transmit the force of the spring to the rod.

The central one of the spring rod arms is different from the other two in that it carries a toe 70 for engaging in a notch of a trip arm 71. This trip arm is pivoted on a bracket 72 and its motion is controlled by the action of the brush release solenoid 27 which is also mounted on this bracket and the plunger of which is pivotally connected with the trip arm 71. This trip arm holds the entire brush in readiness, as shown in Fig. 5, until the drawing up of the plunger of the solenoid 27, thus releasing the toe 70. The three springs are free to rotate the brush arm shaft pushing the brushes forward against the web. When the brush arms are lifted to inoperative position, the upper ends of the spring rods 67 come in contact with abutments 74 on collars secured to the shaft 60. In this way the springs are placed under pressure so that the release of the solenoid 27 allows the toe 70 to relatch in the notch of the trip arm 71. As stated before, the frame formed of the three frame arms 23 is lifted by the levers 59.

The outside frame arms carry studs 75 each of which operates in a short slot 76 giving a small amount of play and located in the levers 59. On the outside edge of the frame arm at one end of the frame a stud 77 is used for the purpose of pivotally mounting a pawl 78 which is provided with small teeth. These teeth are adapted to come into mesh with the teeth on the arcuate outside surface of the segment arm 62. This pawl 78 also carries an upper projection on which is mounted a stud 79 which fits in a hole in the end of the lever 59. The segment arm 62 swings on the hollow shaft 60 and is held in a slightly yielding manner by a pivotally attached rod 80 engaging a poppet 81 which is secured by a screw pivotally to the frame 37 of the machine. A spring 82 on the rod provides for the yielding action.

This construction is provided so that when the frame arms move from the position shown in Fig. 1 to that shown in Fig. 5 the teeth of the pawl 78 will engage the teeth on the segment arm 62. This prevents any motion of the frame to the right as viewed in Fig. 5 by the pressure of the roll against the brush.

When the lever 59 is operated to lift the frame the small amount of play in the slot 76 permits motion of the pawl 78 to disengage these teeth before the lifting of the frame begins. A similar construction is used on the other end of the machine.

One extension 24 is attached to each of the outer frame arms and two to the central frame arm, thus making four of these extensions to bear against the four tension straps 25, if that number of tension straps is used. Each of these extensions 24 is pivotally mounted on the shaft 63 by means of two plates 84. A stud 85 and a bolt 86 are mounted in the lower portion of each of these plates. The plates 84 are so shaped that they come in contact with an abutment 87 in the frame arm to which they are attached. Ordinarily the extensions 24 can swing in a clockwise direction around the shaft 63 as viewed in Fig. 5 but only to a straight line position in a counterclockwise direction.

This provides a rigid structure when the extension comes in contact with the butt of the roll but the extension does not take up excess space when the arms are raised as shown in Fig. 1. If it is desired to operate a fractional width roll so that any of these extensions are not needed the lower bolts of the plates 84 can be removed and the extensions swung up around the studs 85 as a center. They can be latched by a pin 88 in the extension 24 to a link 89 attached to the rear of the frame arm.

The power for lifting the caterpillar and frame arms is provided by a small motor 22 which through gears drives a worm 91. The worm meshes with a gear segment 92 on the shaft 40. The shaft 40 has a clutch collar 93 pinned to it having teeth engaging similar teeth on the lever or arm 41. Thus the caterpillar is raised and allowed to drop by the force of gravity under the control of the motor.

A certain amount of lost motion is provided between the clutch teeth of the parts 41 and 93 so that the frame arms are allowed to come into their lowermost position by their own weight. Of course, they are lifted by the motor 22 when the caterpillar is lifted. Another arm 94 is keyed to the shaft 40 and pivoted to a link 95. The latter has a slot 96 in its other end through which it is pivotally connected with a lost motion, with an arm 97 keyed to the hollow shaft 60 for operating it. The oscillation of the shaft is limited by a fixed pin 98 and a slot 99 in the end of the hub of the arm 97. The slot 96 is provided for permitting the frame arms to reach their lower or operative position before the arm 97 moves. When the upper end of the slot 96 moves the arm 97 outwardly away from the new roll, the proper mechanism is set in motion so that the "monkey" switch lever is placed between the incoming roll and the old web. When the brush mechanism is being lifted the arm 97 is not moved to reset the "monkey" switch mechanism until near the end of the lifting stroke.

The cover 100, which forms a guard over the segment 92, serves as a support for the limit switches 9. The limit switches are operated through an arm 101 secured to the end of the shaft 40. When the frame arms are lowered to the point at which the extensions 24 touch the exhausted butt, the "lifting" mechanism is downward until the limit switch on that side is connected by the arm 101 and causes the motor 22 to stop. As the exhausted roll is not always in the same position, nor of the same size, the necessary delay is provided for in the lost motion between the clutch teeth on the shaft 40.

In order to stop the reel in such a position as to leave the fresh web roll at the proper distance from the brush over which the web is traveling, an arm 102 is provided which, when lowered with the frame will clear the web and be located in a position adjacent to the space between the surface of the fresh web roll and the running web. This arm is so mounted and arranged that when it is tripped by being engaged by the moving web roll it will move out beyond the end of that roll and out of the space between the roll and the web and it acts, as will appear, to stop the reel and set up the pasting mechanism.

The framework carries a shaft 104 mounted in bearings on the frame and set up so as to have a limited end motion and a limited turning motion for a purpose to be described. This shaft has adjustably secured to it a split contact arm 105 on which is mounted an extension rod 106 provided with the arm or extension 102.

The shaft 104 is provided with a spring 107 surrounding it. One end of this spring is attached to one of the lifting arms 23 by having its end projecting out longitudinally into a hole in this arm. The other end of the spring is fixed in the same way to a collar 108 fixed on the shaft 104. Therefore the spring 107 tends at all times to force the shaft 104 to the left to cause the arm 102 to project outwardly beyond the end of the web roll and out of the space just described so the new roll can pass it.

The shaft 104 is provided with two small keys 109 cooperating with a slot in the end of a block 110 to form a tongue and groove connection. Thus when the mechanism is in the position shown in Fig. 10 the keys do not register with the slot but rest against the right end of the block and any movement of the block to the right will cause the shaft 104 to be pushed to the right also.

A vertical shaft 111 is mounted in bearings on one of the frame arms and carries a yoke 112 adapted to cooperate with a pair of trunnions on the block 110. At its upper end the shaft 111 carries a gear 113 meshing with an annular rack 114 slidingly mounted on the hollow shaft 60. Inside this hollow shaft is a shaft 116 carrying a pin 117 by which the rack 114 is fixed to it. This pin extends through a longitudinal slot in the hollow shaft to allow relative motion between the shaft 60 and 116. Any end motion of the latter will cause a corresponding motion of the block 110 by the gearing just described.

The outer end of the shaft 116 is reduced and carries a collar 118 and a plug 119. Between the collar and plug is a spring 120. The collar is fixed to the shaft 116 and the plug is practically fixed to the hollow shaft 60. On the shaft 116 is a cap 121 to which is secured a cam 122. This cam cooperates with complementary bevel surfaces of a stationary cam 123 attached to the frame 37 of the machine. The turning of the shaft 60 therefore causes the shaft 116 to have a longitudinal motion due to the action of these cams. The two cams have a certain amount of lost motion between their bevel surfaces. During the first part of the operation of the hollow shaft 60 the levers 59 lower the frame arms carrying the brush mechanism. It is not until after the frame arms have been lowered that it is desired to have the cams 122 and 123 push the shaft 116 to the right and thereby move the plug 110. This pushes the monkey switch shaft 104 to the right and the switch arm 102 into the space between the new roll B and the running web.

As the reel continues to rotate the fresh web roll B comes into contact with the arm or extension 102 and causes rotation of the shaft 104 until the small keys register with the slots in the end of the block 110. Then the pressure of the spring 107 is free to force the shaft 104 to the left, which it does. This brings the arm 102 back into the position shown in Fig. 8, out of the path of the roll B so that the reel can continue to rotate.

It will be remembered that in the description of the wiring diagram, Fig. 20, it was shown that the contacts 7—7 in the monkey switch were in the circuit controlling the operation of the reel motor 16 and consequently this circuit is ready to be closed when these two contacts are closed. Also the two contacts 11—11 control the hold-in contactor magnet 30. Therefore the stopping and starting of the reel is controlled by the contacts 7—7.

The box 125 in which the monkey switch is located is attached to the end frame arm 23. The contactor plate 126 in the monkey switch is mounted on a rod 127 which is secured to a head 128 mounted on a sliding sleeve 129. This sleeve is carried on a bracket 130 on one of the frame arms 23, which bracket is bolted thereto and furnishes a bearing for the shaft 104. This bracket is provided with a pin 131 entering a slot in the sleeve 129. The end of the shaft 104 is provided with a square tongue 132 which can be turned to two positions, obviously, in one of which it enters a slot 133 in the end of the sleeve 129 and in the other of which it rests against the bottom or inner end of the sleeve as shown in Fig. 11. It moves the sleeve longitudinally with it to the left to bring the contact plate 126 into the position shown in that figure to close the contacts 11, leaving the contacts 7 open.

When the monkey switch lever or extension 102 is in the dotted line position in Fig. 8, and also as indicated in Fig. 5, and the reel is started, the fresh roll B will come into contact with this extension and swing it over as indicated in dotted lines in Fig. 5, taking the shaft 104 with it against the resistance of the spring 107. It is at this time that the tongue 132 comes in contact with the inner flat surface of the sleeve 129 as shown in Fig. 11 and operates the monkey switch in that position, thus breaking the circuit at contacts 7—7 and stopping the reel motor. The purpose of the slot and pin connection for the sleeve 129 is to allow a turning motion of the shaft 104 to open the contacts 11 and reclose the contacts 7. When the shaft 104 is turned to such a position that the slot 133 registers with the tongue 132, the spring 134 of the monkey switch will push the sleeve to the right and thereby open the contacts 11 and close the contacts 7. This, of course, disconnects the holding contactor and connects up the line to be ready to start the reel motor 16 to rotate when the button 15 is pressed. This results in the starting of the reel forward to bring the fresh roll B into the position of the running or nearly exhausted roll C shown in that figure.

When the solenoid 31 is energized, the plunger, of course, is pulled inwardly and by means of a link 135, pivoted to the plunger, turns a bifurcated projection 136 to which the other end of the link is pivoted. This projection is mounted on a shaft 137 and therefore turns this shaft. On this shaft is a pawl 138 which, by the action of the solenoid, is placed in the position shown in Fig. 17.

It will be understood that each one of the rolls of paper on the reel is carried by two chucks, one extending into each end of the roll. One of these chucks is usually mounted so as to be movable longitudinally and the other on a rack and lever pinion to permit rotating and unloading.

The so-called stationary chuck 140 is mounted on a shaft 141 which is really a part of the chuck. On this shaft, at the end opposite the chuck proper, is a brake disc 142 having two opposite projections 143. These projections are so related to the pawl 138 that when the pawl is moved, as just described, it comes into the space between the two projections and at the end of a half revolution will positively stop the brake disc. This, as will appear, applies the brake and severs the web.

It will be understood that the chuck is rotated by the web roll itself. The shaft 141 is mounted in ball bearings, the inner races of which are clamped in position by a shoulder 144 on the right hand end of the chuck shaft as indicated in Fig. 16, a spacer sleeve 145, a brake shoe disc 146, a contact cam 26 and a lock nut 148. This lock nut screws on the end of the shaft 141.

The parts just mentioned rotate with the chuck and the web roll. These parts are all mounted in a brake casing 150 mounted in and secured to the double arm 151 of the reel R which supports the web rolls. The brake casing furnishes bearings for the outer races of the ball bearings, which are covered by seals 152 and 153. The brake disc 142 is mounted loosely on a concentric boss of the brake shoe disc 146. The brake disc has as a part of it a flat annular plate constituting in effect a friction surface. On opposite sides of these are loose brake shoes 155. One of them bears against an annular projection 156 from the brake shoe disc and the other against a slidable brake shoe disc 157. This disc 157 is pressed to the right in Fig. 16 by a series of strong springs 158, each one bearing against a flange on a slidable collar 159 backed up by a lock nut 160 on a stud 161. Each stud is located by its head fitting in a counter bore in the brake disc 146 and pierces the disc 137 through a close fitting hole. Six of these springs may be provided so as to put an even adjustable pressure on the brake disc 157.

The brake casing 150 is provided with bearings in which the shaft 137 is mounted. On this shaft is fixed a collar 164 receiving one end of a spring 165, the other end of which is fixed in one of the bearings for the shaft 137. This spring is so located that it tends to rotate the shaft 137 in a counterclockwise direction as viewed in Fig. 17, that is, to oppose the action of the solenoid 31 and restore the shaft to its original position after the solenoid has operated, taking the pawl 138 out of the path of the projections 143.

The rotation of the shaft 137 by the action of the solenoid of course always rotates a gear segment 166 fixed on the other end of the shaft. This gear segment meshes with a bevel gear 167 on a radial shaft 168 just above a shoulder on that shaft. Below the shoulder is a spaced collar 169 secured to the shaft. Frictionally held between this collar and a friction washer 170, held by a lock nut 171, is a knife holder 172 carrying a knife 173 for severing the web from the stub of the exhausted web roll. A shoulder, collar, or end of the shaft 168 bears against a cap 174 secured to a bracket 175 on the brake casing 150. This construction is to provide a bearing for the shaft 168 and means for holding it against longitudinal motion.

It will be understood that the application of the brake is accomplished through the turning of the pawl into a position to be engaged by one of the projections 143. This causes the brake disc 142 to come to a stop. Through the frictional contact of the brake shoes this supplies a brake to the butt of the exhausted roll carried by this chuck. The stopping of the roll by means of the brake, together with the turning of the shaft 168 accomplished at the same time, turns the knife 173 into operative position until it severs the web.

It should have been stated that when the brush mechanism is lowered into contact with the exhausted roll, the incoming roll is already rotating up to web speed and the reel has been run forward to the proper position. When the monkey switch is tripped, the last contact to make to release the brush is the one on the end of the chuck which is arranged to act in accordance with the position of the paste on the periphery of the incoming roll B. The contact cam 26 rotates with the chuck which carries a distinguishing mark at a point on the periphery of its flange to indicate the location of the forward end of the web on the incoming roll B. The cam 26 presses against a spring connection 180 through an insulating strip 181 which is secured to this spring connection and this makes the contact at the points 10, once during each revolution of the chuck 140. The contacts 10, of course, are mounted on two members 180 and 182 respectively which are secured to insulating blocks 183 mounted on the brake casing and provided with a closing circuit, as indicated in Fig. 20, to the brake solenoid 31. In this way the brake is applied at the proper time when the roll B rotates to a predetermined position, in which the line paste is attached to the running web.

After the web is spliced it is desirable to allow the two webs to run into the press together to a certain point before the brake is applied and the knife operated, regardless of the speed of the press. No longer "tail" is needed on a paster made at high speed than one made at low speed, for when the paste gets into the leading-in tapes, or the impression, the old web may be broken with impunity. Fig. 19 shows a device whereby an electrical contact starts a mechanism, the completion of which is dependent on the speed of the press. A bracket 185, which is secured to the frame 37, forms one of the main bearings for the shaft 44 which is the main drive shaft for the caterpillars from the press. The bracket 185 has a base or insulating panel 186 on which is mounted a bracket 187 for supporting a solenoid 29. The plunger 189 of the solenoid is pivotally connected by a link 190 to a bell crank 191 which is oscillatably carried on a pin 192 in a bracket 193 secured to the panel 186. A lever 194 is also pivoted around the pin 192 and insulatingly carries a contact bar 192$^a$.

An angle piece 196 is secured to the lever 194 and abuts against one end of the expansible spring 195 whose other end presses against the flat arm of the bell crank 191 which in turn rests against the lever 194. Near its bottom end the lever 194 carries a bifurcated projection 194$^a$ for pivotally mounting ratchet arms 197 on a pin 197$^a$. The ratchet arms 197 are of strip construction and have a ratchet segment 198 secured between them, so that normally there is no contact between the teeth of the ratchet segment 198 and a toothed pinion 199. The ratchet arms 197 rest against bosses on each side of a pinion 199. A light leaf spring 200 wraps around the pin 197$^a$ and bears against the lever 194 and ratchet segment 198 to keep the ratchet down. The toothed pinion 199 is secured to one end and a worm wheel 201 to the other of a shaft 202 which is rotatably mounted in a bracket 203 secured to the panel 186. The worm wheel 201 meshes with a worm 204 which is secured to a stud 205 which in turn is secured to and rotates concentrically with the shaft 44.

When the solenoid 29 is energized the plunger 189 is pulled up and the bell crank 191, through the link 190 is turned, compressing the spring 195 and moving the lever 194 in a clockwise direction until the first tooth in the ratchet segment 198 meshes with one on the toothed pinion 199. The spring 195 continues to urge the lever 194 and ratchet arms 197 in a clockwise direction, but they are restrained by the toothed pinion 199 according to the speed of the press. When the last tooth of the ratchet segment 198 disengages with one on the pinion 199, however, the lever 194 rotates rapidly in a clockwise direction to close contacts 6, 8 and 6. This results in applying the brake after a set length of paper has been measured off and starting the "lift" motor.

Although I have illustrated and described only one form of the invention I am aware of the fact that modifications can be made therein by any person skilled in the art without departing from the scope of the invention as expressed in the claims. Therefore, I do not wish to be limited in this respect but what I do claim is:—

1. In a web replenishing device, the combination of a frame mounted to move, means carried by the frame for pressing a web against the new web roll, a source of power, a shaft connected to be turned forwardly or backwardly by the source of power, a web roll propelling device for rotating the new web roll on its own axis, means operated by said shaft for manipulating said web propelling device, and means operated by said shaft for controlling the moving of said frame toward and from the web.

2. In a web replenishing device, the combination of a frame mounted to swing, means carried by the frame for pressing a web against the new web roll, a source of power, a shaft adapted to be rotated forwardly or backwardly by the source of power, a web roll propelling device for rotating a new web roll on its axis, means operated by said shaft for manipulating said web propelling device and said frame, and means for preventing any motion of the frame away from the web roll on account of any pressure of the roll against it.

3. In a web replenishing device, the combination with a rotatable reel having means for supporting a plurality of web rolls, means for rotating a fresh web roll on its own axis up to web speed, a pivoted frame, means for lowering the pivoted frame to a position in which it backs up the running web and receives the pressure of the fresh web roll when it engages the web to make the paster, and means connecting the web controlling device and the frame to cause them to be raised and lowered in a predetermined relationship.

4. In a web replenishing device, the combination with means for guiding the running web into the press and means for movably supporting the fresh web roll, of a shaft, a frame pivotally mounted on said shaft and free to turn thereon, a lever pivoted on said shaft, a source of power having means connected with said lever for operating it, and means for connecting the lever and the frame to cause the frame to swing with the lever comprising a slot in the lever and a pin carried by the frame and entering said slot thereby giving the frame a lost motion connection with the lever.

5. In a web replenishing device, the combination with a frame freely pivoted, a lever having a connection for operating the frame, a segment, yielding means for connecting the segment with a stationary part of the machine, a pawl carried by the frame for engaging said segment at certain times and preventing the frame from moving backwardly when so engaged, and means for automatically operating the pawl into and out of engagement with the segment.

6. In a web replenishing device, the combination with a shaft, a frame freely pivoted on the shaft and depending therefrom, a lever freely pivoted on said shaft and having a connection with the frame for operating the frame but with a lost motion, an arm freely mounted on the shaft and having a segment, yielding means for connecting the segment with a stationary part of the machine, a pawl carried by the frame for engaging said segment at certain times and preventing the frame from moving backwardly when so engaged, a power operated shaft, and means connected with the last named shaft for positively operating the lever.

7. In a device of the character described, the combination of a pivoted frame, a series of soft surfaced web engaging devices pivoted on said frame, a toe movable with the web engaging devices, yielding means for moving the web engaging devices into operative position, a solenoid having means for engaging said toe and holding it in a position to prevent the web engaging devices moving into operative position, whereby when the solenoid is operated the toe engaging means is moved away from the toe and the yielding means is freed to force the web engaging devices forward against the web.

8. In a device of the character described, the combination of a removable web roll, a pivoted frame depending from its pivot, a shaft carried by said frame, a series of soft surfaced web engaging devices carried by said shaft, a toe carried by said shaft and adapted to hold the shaft in a position to keep the web engaging devices out of operative position, yielding means for moving the web engaging device into operative position, a solenoid having means for engaging said toe and holding it, whereby when the solenoid is operated the toe engaging means is moved away and the web engaging devices will be forced forward against the web under yielding pressure, and means operated by the movement of the web roll for connecting the solenoid with a source of power.

9. In a web replenishing device, the combination of a frame mounted to swing, means carried by the frame for pressing a web against the new web roll, means for bodily moving the new roll toward pasting position, a source of power, a shaft adapted to be rotated forwardly or backwardly by the source of power, a web roll propelling device for rotating a new web roll on its axis, means operated by said shaft for manipulating said web propelling device and said frame, a movable arm adapted to be located in the path of the web roll, means whereby when the frame reaches its operating position said arm is automatically located in the path of the movable fresh web roll to be operated thereby, and means operated by said arm for stopping the bodily movement of the new roll.

10. In a web replenishing device, the combination of a frame mounted to swing, means carried by the frame for pressing a web against the new web roll, means for bodily moving the new roll toward pasting position, a source of power, a shaft adapted to be rotated forwardly or backwardly by the source of power, means operated by said shaft for manipulating said frame, a movable arm adapted to be located in the path of the web roll, means whereby when the frame reaches its operating position said arm is automatically located in the path of the movable fresh web roll to be operated thereby, means operated by said arm for stopping the bodily movement of the new roll, and means for moving said arm out of the path of the web roll.

11. In a web replenishing device, the combination of a reel for supporting the fresh web roll, a motor for operating the reel and a monkey switch having means for controlling the operation of the reel motor, with an oscillatable and reciprocable shaft, an arm carried by said shaft adapted to project into the space between the new web roll and the running web near the time of pasting, and means whereby the turning of said shaft by the engagement of the roll with the arm thereon will operate said monkey switch to stop the reel motor.

12. In a web replenishing device, the combination with a motor for operating a reel carrying a fresh web roll, and a frame adapted to come into position adjacent to the fresh web roll for holding the web while the roll contacts it to form a paster, of a shaft carried by said frame, an arm carried by the shaft and adapted to be located in the path of the fresh roll, and means for moving said shaft longitudinally to draw the arm out of the way of the fresh web roll after it has performed its function.

13. In a web replenishing device, the combination with a reel, a reel motor and a switch in the motor circuit, said reel being adapted to support and move the fresh web roll, a frame mounted to move toward and from the running web and having means thereon for backing up the web so that, when the roll and web contact for pasting, the web will be held against the roll, an arm located in the path of the moving web roll, and means operated by said arm for opening the switch to stop the motor after the web roll is moved into pasting position.

14. In a web replenishing device, the combination with a reel, a reel motor and a switch in the motor circuit, said switch having a spring for opening it and a head, said reel being adapted to support and move the fresh web roll, a frame mounted to move toward and from the running web and having means thereon for backing up the web so that, when the roll and web contact for pasting, the web will be held against the roll, an arm located in the path of the moving web roll, means operated by said arm for opening the switch to stop the motor after the web roll is moved into pasting position, said operating means comprising a shaft having a tongue on the end, a sleeve having a slot adapted to receive said tongue when the shaft is turned to a certain position and to transmit the motion of the shaft in one direction with the sleeve and head when the shaft is turned to another position in opposition to said spring, and means operated by the movement of the fresh web roll for turning said shaft from one position to the other.

15. In a web replenishing device, the combination with a reel for carrying the web rolls, a motor for operating the reel and a switch in the circuit of the motor controlling its operation, of a rotatable and oscillatable shaft, an arm on the shaft adapted to be moved into the path of the web roll, a hollow shaft, means for intermittently oscillating said hollow shaft, a shaft inside the hollow shaft, a cam on the hollow shaft connected with the inside shaft to move it as the hollow shaft oscillates, a circular rack connected with the inside shaft to move therewith, a gear meshing with the rack, a shaft on which the gear is located, means connected with the first and last named shafts for moving the first named shaft longitudinally when the cam operates to move the internal shaft in one direction, whereby said arm is moved into the path of the fresh web roll, and means on the first named shaft for operating said switch.

16. In a web replenishing device, the combination with a reel for carrying the web rolls, a motor for operating the reel and a switch in the circuit of the motor controlling its operation, of a rotatable and oscillatable shaft, an arm on the shaft adapted to be moved into the path of the web roll, a spring for normally forcing said shaft in a direction to take the arm out of the path of the web roll, a hollow shaft, a shaft inside the hollow shaft, means for reciprocating the inside shaft when the hollow shaft is turned, a circular rack on the hollow shaft but connected with the inside shaft to move therewith, a gear meshing with the rack, means connected with the first shaft and gear for moving the first named shaft longitudinally in opposition to its spring when the internal shaft moves in one direction so as to move said arm into the path of the fresh web roll, a spring acting to move the arm back, and means on the first named shaft for operating said switch.

17. In a web replenishing device, the combination with a reel for supporting the web rolls, a reel motor, means for rotating the fresh roll on its own axis, and a switch in the motor circuit, of an arm adapted to be located in the path of a new web roll when it moves up to pasting position, means whereby when the arm is tripped by the new roll it will move out from between the roll and the web, means whereby the first named movement of this arm will operate the switch to stop the rotation of the reel and complete another circuit, means rotatable with the fresh web roll for closing the last-named circuit in another place once during each rotation of the web roll, a solenoid in said other circuit, web-engaging means connected to be released by the operation of said solenoid, and means for moving said web-engaging means to contact the web with the fresh roll when so released.

18. In a web replenishing device, the combination with a reel for supporting the web rolls, a reel motor and a switch in the motor circuit, of an arm adapted to be located in the path of a new web roll when is moves up to pasting position, means whereby the movement of this arm will operate the switch to stop the rotation of the reel and complete another circuit, a solenoid in said other circuit, and web-engaging means connected to be actuated upon the operation of said solenoid.

19. In a web replenishing device, the combination with a reel for supporting the web rolls, a reel motor and a switch in the motor circuit, of an arm adapted to be located in the path of a new web roll when it moves up to pasting position, means whereby the movement of this arm will operate the switch to stop the rotation of the reel and complete another circuit, means rotatable with the fresh web roll for closing the last-named circuit in another place once during each rotation of the web roll, a solenoid in said other circuit, web-engaging means connected to be released by the operation of said solenoid, springs for moving said web-engaging means to contact the web with the fresh roll when so released, a hold-in contactor for maintaining said other circuit closed during the rotation of the new roll on its own axis, a lift motor, means operated by the lift motor for moving the web-engaging means back away from the new roll and web, and means in said other circuit for starting the said lift motor.

20. In a web replenishing device, the combination with a reel for supporting the web rolls, a reel motor and a switch in the motor circuit, of an arm adapted to be located in the path of a new web roll when it moves up to pasting position, means whereby the movement of this arm will operate the switch to stop the rotation of the reel and complete another circuit, means rotatable with the fresh web roll for closing the last-named circuit in another place once during each rotation of the web roll, a solenoid in said other circuit, web-engaging means connected to be actuated upon the operation of said solenoid, a lift motor, means operated by the lift motor for moving the web-engaging means back away from the new roll and web, means in said other circuit for starting the said lift motor, means whereby near the end of the motion of the lift motor it will be stopped and the said switch reset so that the other circuit is opened and the contacts of the first circuit closed, whereby the reel motor can be started upon pressing a button in the reel motor circuit.

21. In a web replenishing device, the combination with a reel and chucks thereon for supporting web rolls, of a brake for the web roll connected with one of said chucks and comprising a brake disc mounted loosely with brake shoes engaging it, said brake disc having projections thereon, a brake solenoid, means for connecting the solenoid up automatically by the rotation of the web roll supported by said chucks, and means operated by said solenoid for moving into the path of rotation of said projections and stopping the brake disc when the solenoid is energized for applying the brake to the chuck and the roll supported thereby.

22. In a brake, the combination with a rotatable chuck for supporting one end of the rotatable roll, of a shaft positively connected with said chuck, a brake connected with said shaft, electro-magnetic means for arresting one portion of the brake, a cam fixed to the shaft, and a circuit in which said electro-magnetic means is located having contacts adapted to be closed by the rotation of said cam, whereby the brake will be applied.

23. In a brake, the combination with a rotatable chuck for supporting one end of the rotatable roll, of a shaft positively connected with said chuck, a brake connected with said shaft, electro-magnetic means for arresting one portion of the brake, a cam fixed to the shaft, a circuit in which said electro-magnetic means is located having contacts adapted to be closed by the rotation of said cam, a brake cylinder in which said shaft is located, a radial shaft, means operated by said electro-magnetic means for turning said radial shaft, a knife holder having a knife for cutting off the web fixed to said radial shaft in position to be projected into engagement with the web when said shaft is turned, and yielding means to turn the shaft back to neutral position.

24. In a caterpillar propelling means, the combination with a shaft connected with the machine to which the device is applied and rotating in proportion to the speed of said machine, a frame pivoted on said shaft, means for raising and lowering the frame about its pivot, a shaft carried by said frame parallel with the first named shaft, means for transmitting rotation from the first shaft to the second shaft, a pulley on the second shaft, an auxiliary frame pivoted on the axis of the second shaft, two pulleys on the auxiliary frame in alignment with the first pulley, one of said pulleys being geared to the second shaft and driven therefrom and the other being idle and a caterpillar driving belt on the pulleys.

25. In a web replenishing device, the combination with a reel for supporting the web rolls, a reel motor and a switch in the motor circuit, of an arm adapted to be located in the path of a new web roll when it moves up to pasting position, means whereby the movement of this arm will operate the switch to stop the rotation of the reel and to complete another circuit, a solenoid in said other circuit, web-engaging means connected to be actuated upon the operation of said solenoid, a timer relay, means controlled by the timer relay for measuring off a predetermined length of paper, said timer relay having a coil in said circuit adapted to be connected with a source of power by the closing of the circuit, a brake for the exhausted web roll, and a circuit connected with said brake and adapted to be closed by the movement of the relay.

26. In a web replenishing device, the combination with a reel for supporting the web rolls, a reel motor and a switch in the motor circuit, means whereby the movement of the web roll will operate the switch to stop the rotation of the reel and to complete another circuit, a timer relay having a coil in said other circuit adapted to be connected with a source of power by the closing of the circuit, a brake for the exhausted web roll, and a circuit connected with said brake and adapted to be closed by the operation of the relay for setting the brake for measuring off a predetermined length of paper.

27. In a web replenishing device, the combination with a shaft connected with the printing press and operating at a speed proportionate to the speed of the web, a brake for the expiring web roll, an electric circuit adapted to be completed by the movement of a fresh web roll, a solenoid located in said circuit, a timer relay for said circuit, means connected with the plunger of said solenoid for closing the timer relay and controlled by said shaft for limiting the time of setting of the brake in accordance with the speed of rotation of said shaft.

28. In a web replenishing device, the combination with a fresh web roll, of an electric contact adapted to be connected by the movement of the fresh web roll into pasting position, a circuit adapted to be completed by the closing of said contact, a solenoid in said circuit, means operated by the plunger of said solenoid for controlling the application of a brake to the running web roll, and means timed to operate in proportion to the speed of the press for controlling the period of operation of the last named means.

29. In a web replenishing device, the combination with means for making a paster and a brake for stopping the rotation of the exhausted web roll, of means dependent upon the speed of the press for applying said brake after the press has continued its operation for a predetermined time after the paster is made.

30. In a mechanism for splicing web rolls, the combination with a movable frame and a rotatable reel for supporting paper rolls, of a switch adapted to stop the reel in a position for splicing, and means controlled by the movable frame for resetting the switch to allow the reel to resume its rotation.

In testimony whereof I have hereunto affixed my signature.

HENRY A. WISE WOOD.